May 22, 1951  M. L. FLICKINGER  2,554,178
PURGING DEVICE FOR FUEL TANKS

Filed March 22, 1949  2 Sheets-Sheet 1

INVENTOR.
Maynard L. Flickinger
BY

INVENTOR.
Maynard L. Flickinger

Patented May 22, 1951

2,554,178

UNITED STATES PATENT OFFICE 2,554,178

PURGING DEVICE FOR FUEL TANKS

Maynard L. Flickinger, Akron, Ohio, assignor to Goodyear Aircraft Corporation, Akron, Ohio, a corporation of Delaware Application March 22, 1949, Serial No. 82,811

4 Claims. (Cl. 244—135)

This invention relates to fuel tanks in non-rigid airships, or the like, and in particular to a safety device applied in purging fuel or fuel vapors therefrom.

Heretofore, devices using extinguishing fluid or inert gas for preventing or extinguishing a fire in a fuel tank have been known. however, these devices are somewhat complicated and not suitable for all cases. Moreover, known devices are not adapted to operations with lighter-than-air craft in which it may be necessary to jettison or dump quantities of fuel to lighten the craft.

When purging under certain circumstances volatile fuel from a fuel tank in a non-rigid airship in flight, there is the possibility of developing static electricity and consequently electric sparks which might ignite fuel vapors mixed with air, or sparks from the engine exhaust may cause ignition. Ordinarily when fuel is jettisoned and the outlet duct of a tank is filled with fuel, there is little danger of the fuel being ignited and causing a fire or explosion in the fuel duct and tank. However, as soon as most of the fuel has been drained and air is admitted there is the danger that a mixture of fuel vapors and air may become ignited or cause an explosion.

It is the general object of the invention to avoid and overcome the foregoing and other difficulties of and objections to prior art practices by the provision of means for admitting inert lifting gas under pressure, simultaneously with opening the fuel dump valve to prevent formation of inflammable fuel-air mixtures.

Another object of the invention is to continue for a short period the admission of inert lifting gas into the fuel tank and into the fuel duct at the bottom of the tank after the fuel dump valve has been closed, which is particularly advantageous after a partial jettisoning operation, to eliminate inflammable fuel mixtures.

Another object of the invention is to provide a simple and inexpensive device for preventing fire hazards in dumping fuel from tanks and which comes into action the instant fuel is dumped.

Another object of the invention is the provision of improved safety means in association with liquid fuel tanks for aircraft.

The aforesaid objects of the invention, and other objects which will become apparent as the description proceeds, are achieved by providing a gas valve disposed at the top of and between the fuel tank and the airship lifting gas envelope and a fuel dump valve inserted in a fuel duct connected to the bottom of the fuel tank and leading outside of the airship. The interior of the top of the fuel tank and the discharge duct of the fuel valve are connected with a by-pass gas line, ordinarily serving as a vent, and a control check is attached to the valve operating lever to retard closure of the gas valve in respect to the fuel valve after the control lines of both valves have been simultaneously released. After such release the fuel valve closes immediately, whereas, the gas valve is still open to admit gas into the tank and also into the fuel duct via the by-pass gas line to prevent air from entering the fuel duct until all liquid fuel and its vapors have been purged therefrom to prevent forming of inflammable or explosive mixtures.

For a better understanding of the invention reference should be had to the accompanying drawing, wherein Figure 1 is a fragmentary cross-sectional view, taken on line I—I of Figure 2, of one embodiment of the invention.

Figures 1, 3:
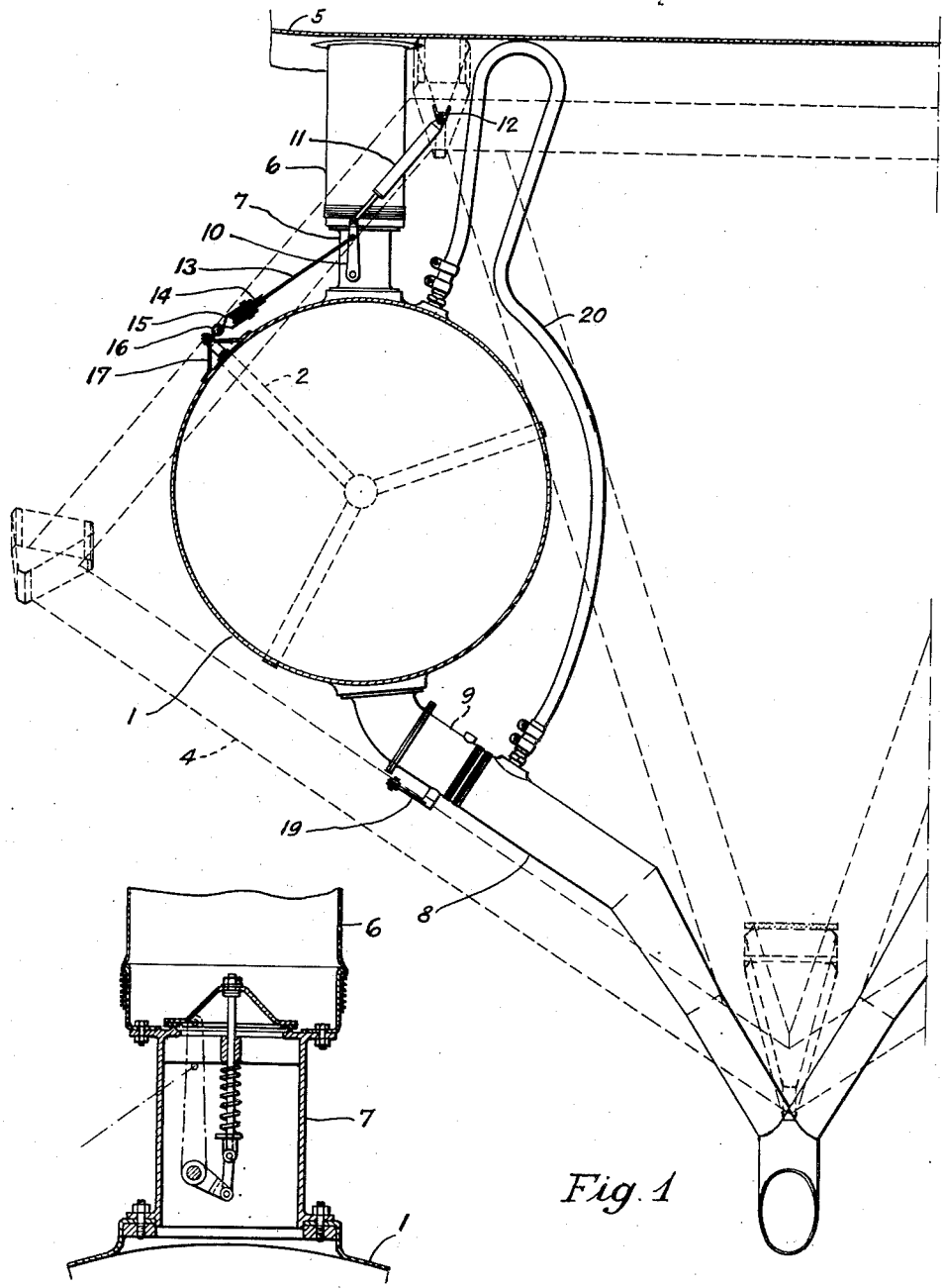
Figure 3 is a vertical cross sectional view of the valves in larger scale.
Figure 2:
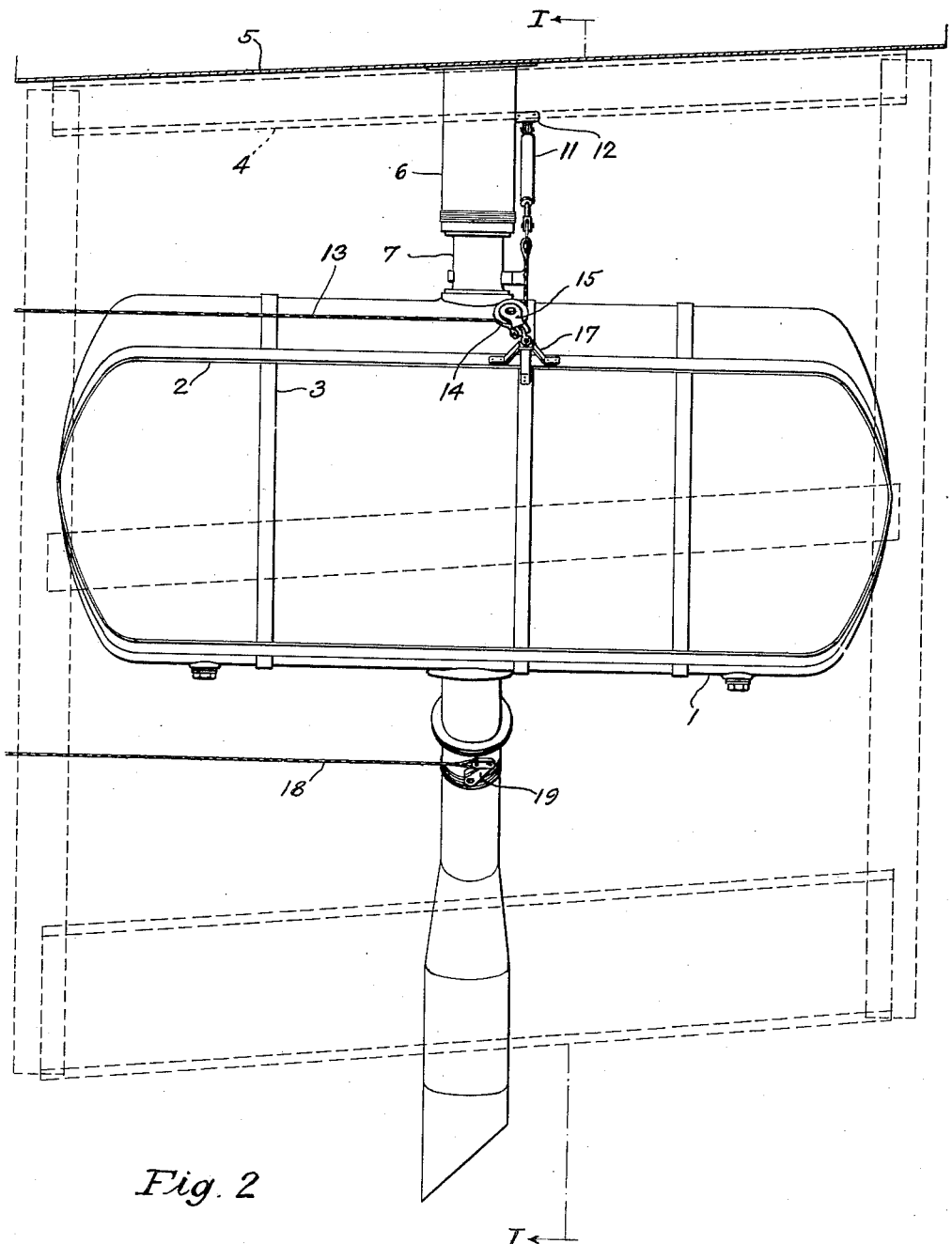
Figure 2 is a side view of Figure 1.

With specific reference to the form of the invention illustrated in the drawing, the numeral I indicates one of two symmetrically arranged fuel tanks provided with bands 2 and 3 crossing each other for supporting the tank by wires or cables (not shown) in the airship structure 4 carried by an envelope 5 containing helium, an inert lifting gas. A fabric sleeve 6 and a spring loaded gas stop valve 7 connect the top of the fuel tank I with the gas envelope 5, and a fuel duct 8, provided with a spring loaded fuel dump valve 9 similar in construction to stop valve 7, is attached to the bottom of the tank I and leads outside of the airship.

To the operating lever 10 of the spring loaded gas valve 7 is pivotally attached one end of a closure retarding device 11 of any known type, such as a pneumatic door check, the other end of which is pivotally attached to a bracket 12 fastened to the structure 4. A control cable 13 connected with one end to the operating lever 10 and leading to an operating station (not shown) leads over a pulley 14 which is pivotally mounted in a support 15 secured by a shackle 16 to a bracket 17 fastened to bands 2 and 3 surrounding the tank. A second control cable 18 connected to the operating lever 19 of the fuel valve 9 is operated together with cable 13 with which it is united at some point distant from the tank. The interior of the top of the tank and the fuel discharge duct are connected by a gas by-pass duct 20 which when the gas valve 7 is closed serves as vent for the fuel tank, but during delayed closing of the gas valve delivers inert gas for flushing the fuel duct and to remove remains of fuel or fuel vapors therefrom. This by-pass duct is especially important in case only a portion of the fuel is dumped, because then, the inert gas fills only the emptied portion of the tank but does not pass through it.

It will be recognized from the aforesaid that the objects of the invention have been achieved in a most simple way by the introduction of inert lifting gas at its usual working pressure, which is above that of the atmosphere, to eliminate dangerous gas mixture when dumping fuel without complicated mechanism and special equipment and which comes into play simultaneously with jettisoning of the fuel.

While certain representative embodiments and details have been shown for the purpose of illustrating the invention, it will be apparent to those skilled in the art that various changes and modifications may be made therein without departing from the spirit or scope of the invention.

What I claim is:

1. In combination with an airship envelope for holding inert lifting gas, like helium, above atmospheric pressure, a fuel tank for volatile liquid fuel, a gas duct including a spring-loaded stop valve interconnecting the bottom of said envelope and the top of said tank, a fuel duct including a spring-loaded dump valve extending from the bottom of said tank to the free atmosphere, a gas by-pass duct connecting the interior at the top of said tank with the fuel duct below the dump valve, a closure retarding device on said stop valve, and control lines for simultaneously opening said valves, said control lines, when released, permitting sudden closure of the dump valve, and retarded closure of the gas valve during which inert gas is drained through the by-pass duct into said fuel ducts for preventing formation of inflammable or explosive mixtures by air in said fuel duct.

2. The combination in a non-rigid airship of an envelope holding inert lifting gas, like helium, at slightly superatmospheric pressure, a fuel tank for volatile liquid fuel, a gas duct including a spring-loaded stop valve interconnecting the bottom of the envelope and the top of the tank, a fuel duct including a spring-loaded dump valve extending from the bottom of the tank to the free atmosphere, and control lines attached to both valves to be operated simultaneously to admit the inert gas from the envelope into and through the fuel tank and fuel duct to prevent forming of inflammable and explosive fuel-air mixtures therein.

3. In combination with an aircraft, a fuel tank for volatile liquid fuel, a gas duct including a spring-loaded stop valve connected to the top of the tank, means for supplying inert gas under greater than atmospheric pressure to the gas duct into the fuel tank, a fuel duct including a spring-loaded dump valve extending from the bottom of the tank to the outside of the aircraft, a gas by-pass duct connecting the interior at the top of said tank with the fuel duct below and adjacent the dump valve, a closure retarding device on the stop valve, and control lines for simultaneously opening said valves, said control lines, when released, permitting sudden closure of the dump valve, and retarded closure of the gas valve during which inert gas is drained through the by-pass duct into said fuel ducts for preventing formation of inflammable or explosive mixture by air in said fuel duct.

4. The combination in an airship of the lighter-than-air type of an envelope holding inert lifting gas, a tank holding volatile fuel, a gas duct for supplying said tank with inert lifting gas from said envelope, a spring-loaded gas stop valve in said duct, a retarding device cooperatively connected with said stop valve for retarding the closure thereof, a fuel outlet duct connected to the bottom of the tank, a spring-loaded fuel dump valve in said outlet duct, a gas by-pass duct connecting the top of the fuel tank with said fuel duct below and adjacent said dump valve, said by-pass duct delivering inert gas for purging the fuel duct particularly at partial jettisoning of the fuel, and means for simultaneously opening both of said valves to jettison fuel.

MAYNARD L. FLICKINGER.

REFERENCES CITED

The following references are of record in the file of this patent:

UNITED STATES PATENTS

| Number | Name | Date |
|---|---|---|
| 1,793,777 | Condon | Feb. 24, 1931 |
| 2,248,308 | Rice | July 8, 1941 |